350-6.8 SR
XR 3,872,451

United States X 350/150 [11] 3,872,451
McNaney [45] Mar. 18, 1975

[54] LIGHT OPTIC DATA HANDLING SYSTEM

[76] Inventor: Joseph T. McNaney, 8548 Boulder Dr., La Mesa, Calif.

[22] Filed: Apr. 1, 1974

[21] Appl. No.: 456,548

[52] U.S. Cl. ........................... 340/173 LM, 350/3.5
[51] Int. Cl. ....................... G11c 11/42, G11c 13/04
[58] Field of Search .............. 340/173 LT, 173 LM; 350/3.5

[56] References Cited
UNITED STATES PATENTS
3,767,285 10/1973 Mezrich ...................... 340/173 LM
3,800,298 3/1974 Ogura ........................ 340/173 LM

*Primary Examiner*—Terrell W. Fears

[57] ABSTRACT

The system herein includes light optic means which functions as a light beam distributor in making available, almost instantly, an information bearing beam of light at a multiplicity of output positions in the system, as opposed to many well known line scan beam deflection systems. The information bearing light output thereupon lends itself to data display, recording or communications.

9 Claims, 8 Drawing Figures

3872451
OR IN 340/173LM

LIGHT OPTIC DATA HANDLING SYSTEM

SUMMARY OF THE INVENTION

An information bearing light beam is directed along a primary optical path, by means of a series of total internal reflections, and made readily available for a redirecting thereof along secondary paths, selectively, utilizing electro optic means, at any of a number of controllable light reflecting positions in the system. Information contained in the light beam, in combination with its output position, may thereupon be utilized for the display, recording, transmission or data handling control purposes.

It is an object of the invention to provide the equivalent of a plurality of widely deflected light beams, but each providing a line scan array of precisely positioned light beams and doing so entirely independent of voltage, current, control circuit, or deflection element stability.

These and other objects, features, and advantages of the invention will best be understood from the description which follows when read in connection with the accompanying drawings.

DESCRIPTION OF THE INVENTION

Figures 1, 2:
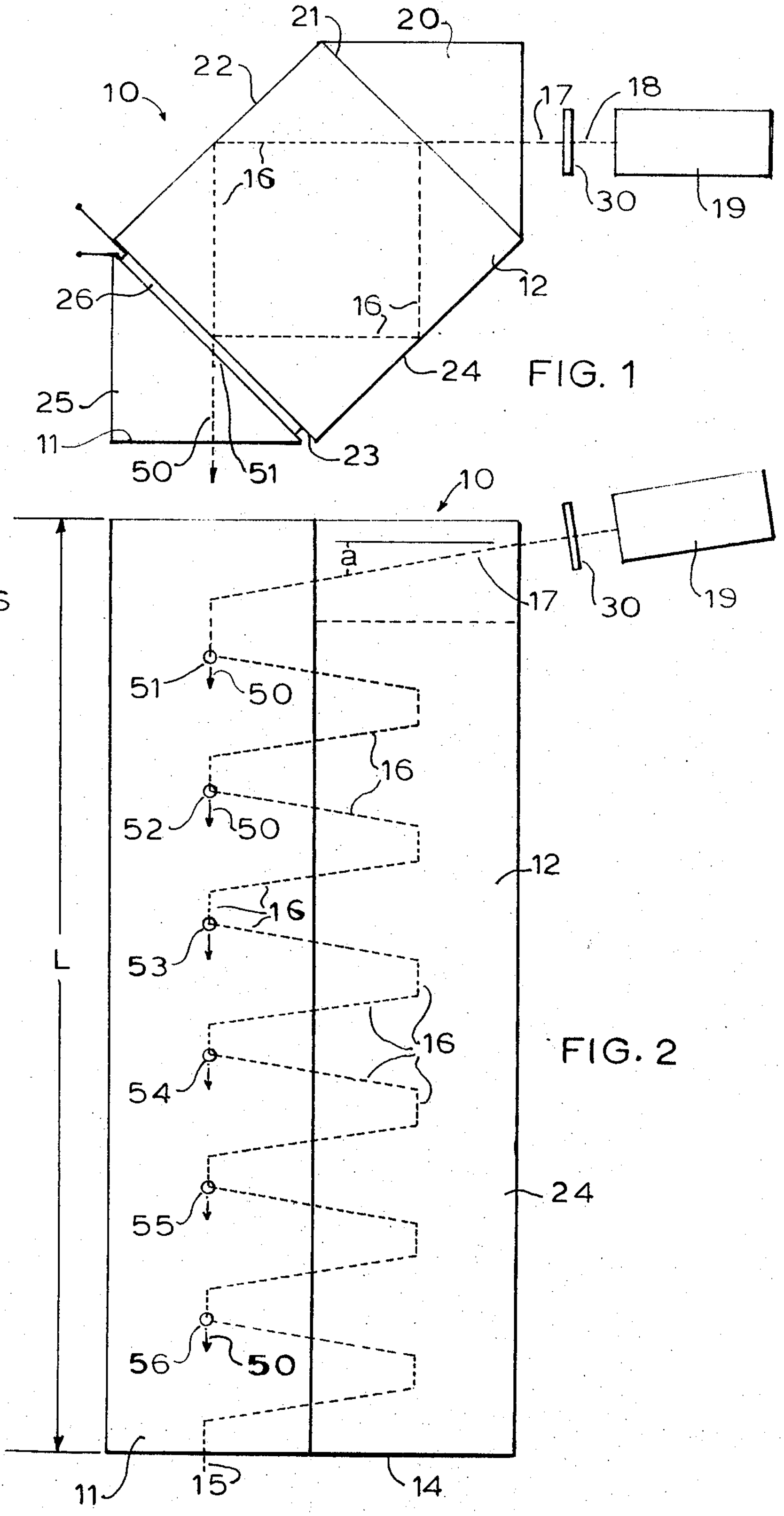
FIGS. 1 and 2 are first and second views of the basic light beam positioning system.

Referring now to FIGS. 1 and 2 a beam control unit 10 is illustrated which includes, for example, a four-sided block 12 of a light conducting material such as glass, plastic, or the like, having a rectangular cross section and a length L. Closely adjacent one side 21 thereof there is shown a prism 20, the material being like that of block 12. A light source 19 provides, preferably, a monochromatic light output 18 directed along a path 17 at an angle a, as indicated in FIG. 2, however the angular approach along the path 17 has been exaggerated so as to simplify the discussion of the invention. Upon entering the block 12 the beam of light will be directed along, what will be referred to as, a primary optical path 16, essentially spiralling its way to a point of exit 15 at the opposite end 14 of the block 12.

Adjacent the side 23 of the block 12 there is a prism of light conducting material 25 essentially equal to length L of block 12. Between the prism 25 and the side 23 there is an assembly of electro optic light reflection control means 26, shown in FIG. 3, comprising an optically transparent electrode 28 intimately deposited on the side 23 surface of the block 12, an electro optic material 29 intimately joined with the electrode 28, and a series of optically transparent electrodes 31 through 36, each intimately joined with the material 29. The material 29 may be of a crystal such as potassium dihydrogen phosphate, or the like, but preferably a ferroelectric ceramic composition of a type set forth in the U.S. Pat. No. 3,744,875. However, the material 29 may be that of a number of Kerr effect or Pockels effect materials in either a solid, liquid, gas or colloidal state.

In spiralling its way through the block 12 the light beam along the path 16 undergoes a series of total internal reflections, one at each interface of the block 12 material and media adjacent each of its sides 21, 22, 23 and 24, the media in each case presenting a lower index of refraction than that of the block 12. A light polarizing plate 30 is shown positioned along the path 17 for effecting a horizontal polarization of the light beam, that is, parallel with the plane of the drawing. The layer of material 29 will serve as an analyzer, or a second polarizer oriented at 90° to the polarizer plate 30 in the absence of an electric field. Each of the electrodes 31 through 36 is coupled through switch means, 41 through 46, for example, to a source of voltage 40. Upon closing one of the switches an electric field is created in the layer 29 adjacent the electrode to which that switch is connected, effecting a 90° change in the polarization thereof. The layer 29 actually serves as an electrically controlled light shutter. Under certain electric field conditions the electro optic characteristics of the material 29 will effect a reflection of light at the interface thereof and the block material 12 along the primary path 16 toward the side 24 of the block 12, and a change in electrical field conditions and electro optic characteristics of the material 29 will frustrate said light reflections to the extent of allowing a passing of light along a secondary path 50. Therefore, a beam of light entering the block 12 will be totally reflected along a series of 360° side-by-side optical paths until reaching the point of exit 15, or, be permitted to pass along a secondary path 50, each leading from one of a plurality of light output positions 51 through 56. Depending upon which of a wide choice of materials 29 selected for use in the system electric field requirements will be determined accordingly. And in each case a passing of light along a path 50 will be determined by characteristic changes therein, including polarization, refractive index, or both.

Figure 4:
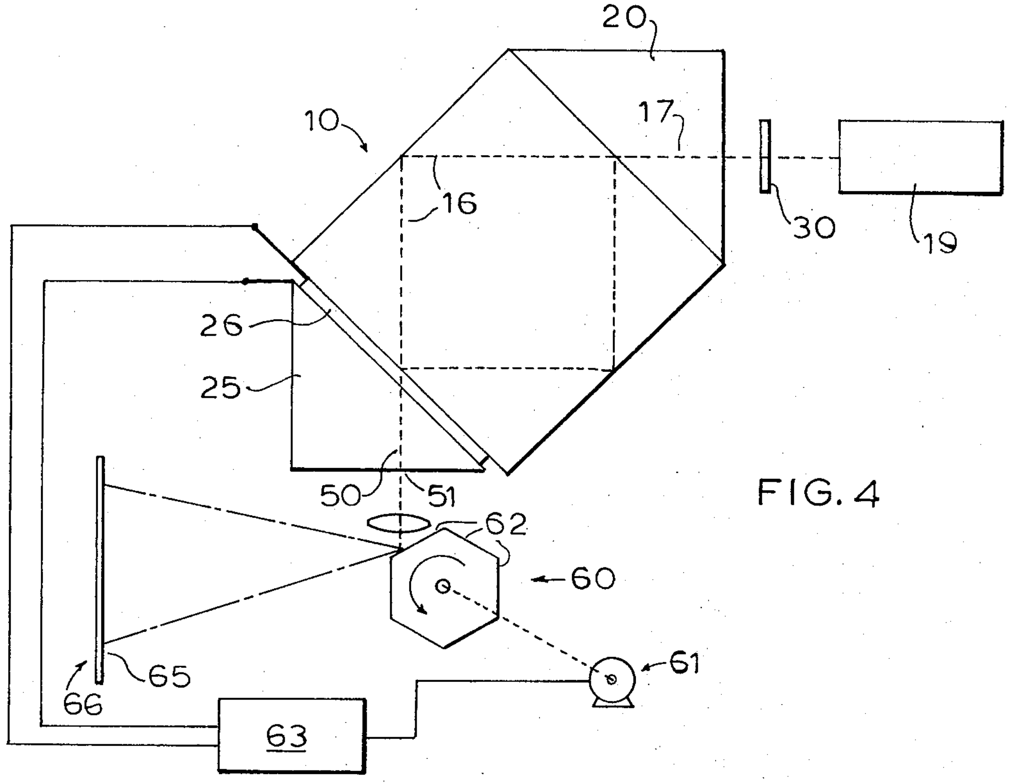
FIGS. 4 and 5 are views of several additional embodiments of the system invention herein.

Referring now to FIG. 4, means of utilizing a light output of the system of FIGS. 1 and 2 is illustrated as comprising a rotatable light reflector 60, driven rotatably by means of a motor 61. The reflector 60 may be a rotating mirror scanner, as shown, having light reflecting surfaces 62, or, a prism type scanner, or the like. However, from a source of recordable information and system control data 63, light reflecting surfaces 64 of the reflector 60 provides a scanning of each line of light output information from the control unit 10, line at a time, across a light responsive surface 65 of a viewing screen 66.

Figure 5:
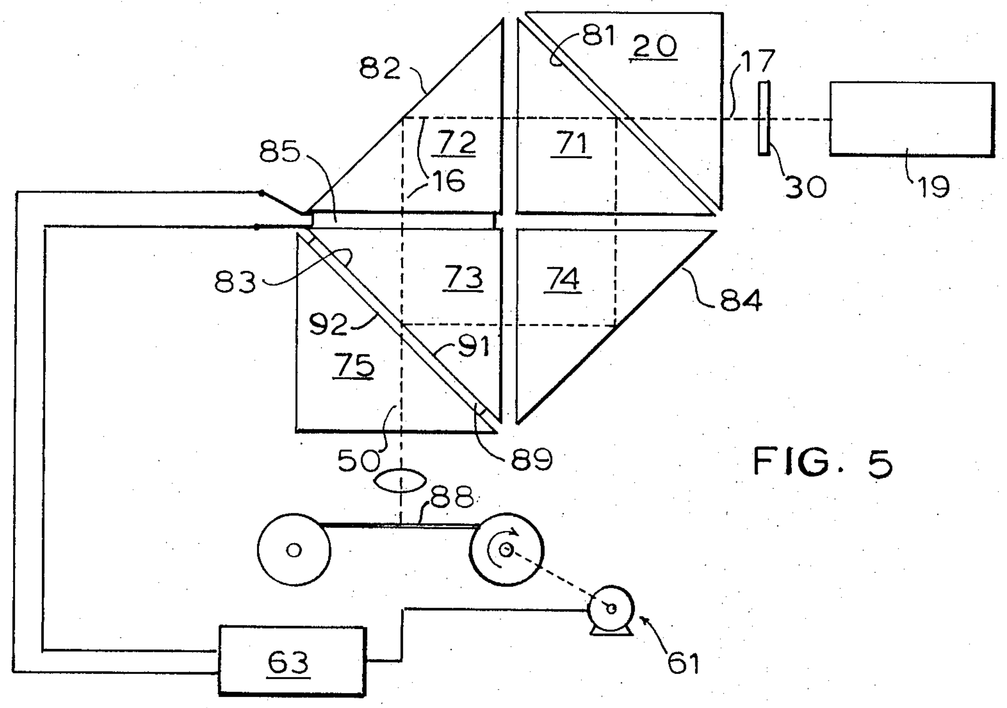

In FIG. 5 a further embodiment of the invention is shown wherein, instead of the four-sided block 12 of light conducting material, a system of four light conducting prisms 71, 72, 73 and 74 are utilized, each having a length dimension L similar to block 12 in FIG. 2. Adjacent the one side 81 of the prism 71 there is shown a prism 20. A light source 19 has its output directed along a path 17 at an angle as indicated in FIG. 2. Upon entering the prism 71 the beam of light will be directed along a primary optical path 16 so as to spiral its way to a point of exit as described in connection with the initial embodiment. Adjacent the side 83 of the prism 73 there is a prism of light conducting material 75 and between the prism 75 and the prism 73 there is an analyzer oriented at 90° to the polarizer plate 30. Between the prism 72 and 73 there is an assembly of electro optic devices 85 supported along the length dimension thereof of a type similar to that described in connection with FIG. 3, and preferably a ferroelectric ceramic composition set forth in the U.S. Pat. No. 3,744,875, but is not to be understood as being limited thereto.

In spiralling its way through the system of prisms 71, 72, 73 and 74 along the path 16 the light beam undergoes a series of total internal reflections, one at each interface of prism sides 81, 82, 83 and 84 and media intimately adjacent thereto. The media in each case presenting a lower index of refraction than that of an adjoining prism material. As indicated in connection with FIG. 3, each of a plurality of electrodes 31 through 36 is coupled through a switch means 41 through 46 to a source of voltage 40. Upon closing one of the switches an electrical field is established in the layer 29 adjacent the electrode to which the switch is connected, effecting a 90° change in the polarization thereof.

In this embodiment it can be assumed that the analyzer 89 has a horizontal polarization, that is, parallel with the plane of the drawing, the plate 30 having a vertical polarization. The analyzer 89, therefore, blocks the passage of vertically polarized light and allows such light to be reflected toward the interface adjacent side 84 of prism 74. Upon rotation of the light beam, 90°, by an electro optic device 85, the analyzer 89 permits the passage of the horizontally polarized light along the path 50 toward a light output position of the system. Light output may therefore be used in a data display manner as shown in FIG. 4, or as indicated in FIG. 5, namely, to record line by line light information on a movable record media 88.

Referring once again to the FIG. 5 embodiment, instead of using the analyzer 89 in providing the shutter action required, prisms 73 and 75 may be a birefringent crystal material, such as sodium nitrate. The 45° angle of incidence of the surfaces 91 and 92 of this material lies between the critical angles for the vertical and horizontal polarizations. This uniaxial crystal has an ordinary refractive index at, for example, a wave length of 5890 angstroms of 1.585 and an extra-ordinary index of 1.3369. Horizontally polarized light sees an index of 1.585 and the vertically polarized light sees an index of 1.3369. The light beam when polarized in a horizontal direction will be totally reflected by the surface 91 and adjacent air interface toward the side 84 of prism 74, and a vertially polarized beam will pass through said interface.

Figure 3:
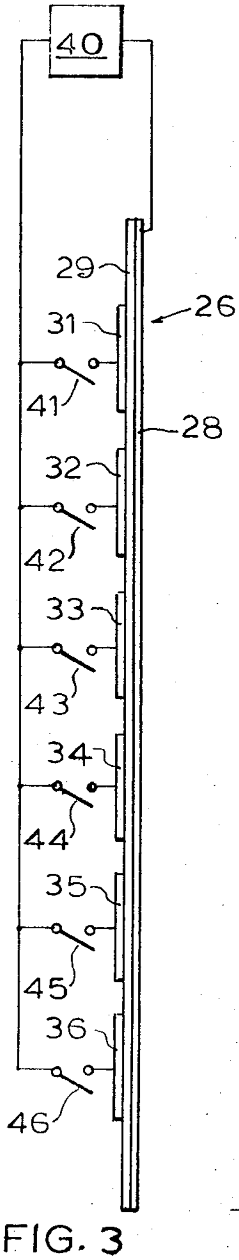
FIG. 3 is a diagram which will be referred to in a description of light reflection output control means utilized in the invention.
Figures 6, 7, 8:
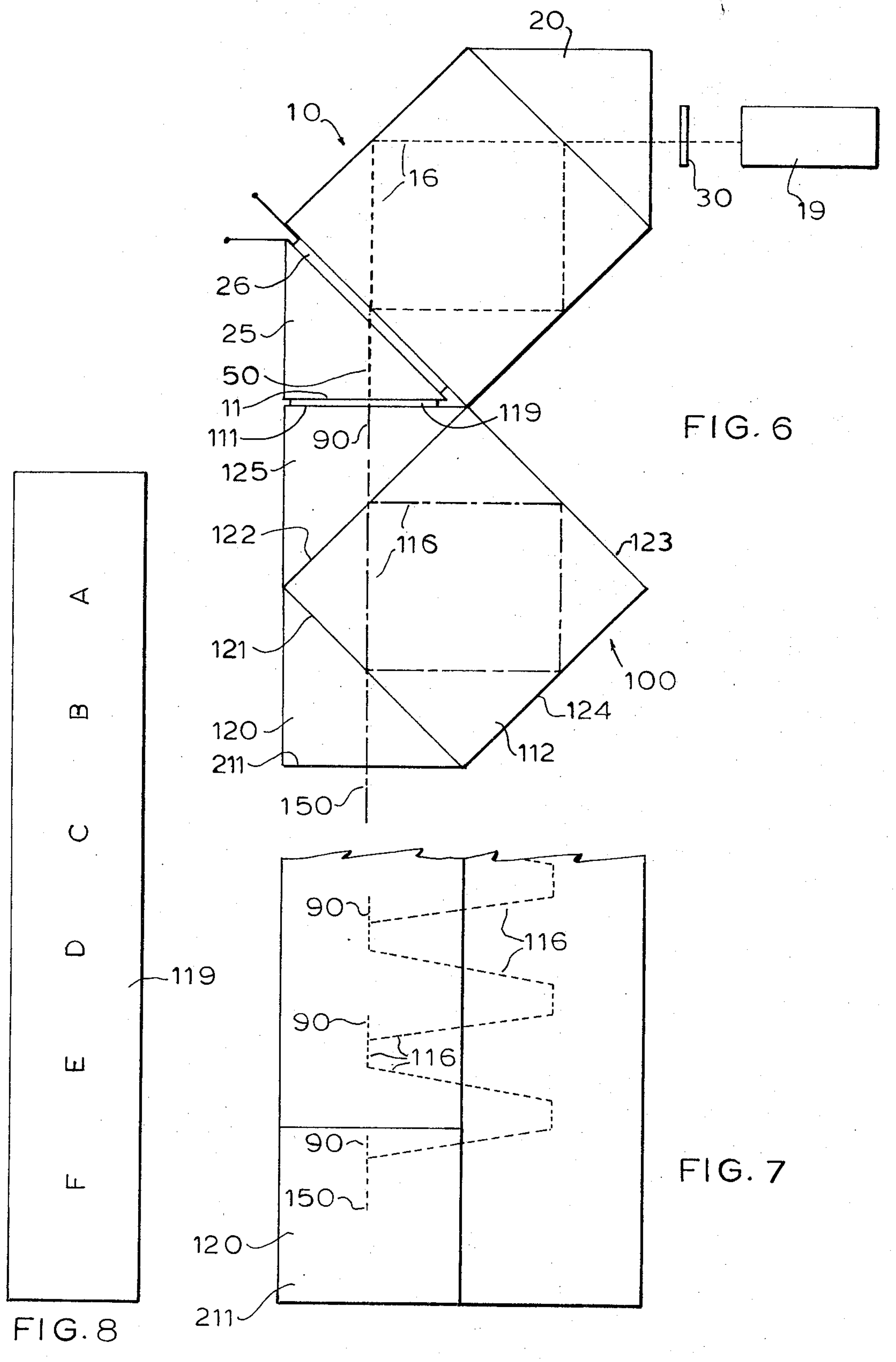
FIGS. 6 and 7 are first and second views of still another embodiment of the system invention.
FIG. 8 is an illustration of a light beam forming element to be included in the latter embodiment.

Referring now to FIGS. 6, 7 and 8, a further embodiment of the invention is shown exemplifying the use of the beam control unit 10 described in connection with FIGS. 1, 2 and 3. However, a beam control unit described in connection with FIG. 5 may be used as well. An output surface 11 of the prism 25 is supported closely adjacent the surface 111 of a similar prism of light conducting material 125 which is intimately joined with a block of similar light conducting material 100. Intermediate surfaces 11 and 111 there is a light beam shaping mask 119, shown to contain a plurality of character shaped windows, A, B, C, etc., therein. In this embodiment, therefore, each of the available output beams along path 50 will be given the shape of a symbol, and a beam control unit 100 will be utilized to direct each beam as it is produced along spiralling paths 116 until it reaches an output path 150. At the output end 114 of the block 112 a prism of light conducting material 120, having the same, or lower refractive index, as that of the block 112, is intimately joined therewith and thereby allowing the beams to escape from the unit at this point. The function of the unit 100 is just the reverse of that of unit 10. Shaped beams will be directed along a plurality of input paths 90, from the output paths 50, along the series of 360° paths 116 until they reach the path 150. Shaped beams along the path 150 may be used as a light source in place of source 19 in FIGS. 4 or 5, thereby allowing shaped beam information to be displayed on the viewing screen 66 or recorded on the media 88.

It should be understood by those skilled in the arts pertaining to the construction and application possibilities of the invention herein set forth that the embodiments included herein illustrate in a very limited sense the usefulness of the invention and that the invention includes such other modifications and equivalents as may be seen by those skilled in the arts, but still being within the scope of the appended claims.

I claim:

1. An optical system for use in a data handling system, comprising:

a. a source of light and means for directing light therefrom along a primary optical path while undergoing a series of total internal reflections within said system and to establish an availability of said light at a plurality of predetermined light output positions in said system for an electrically controlled redirecting of said light along a selected one of a plurality of secondary optical paths stemming from said positions;

b. said means including an array of light reflecting interfaces of first and second light conducting media, each said interface presenting a length dimension;

c. said interfaces each angularly oriented so as to establish an optical relationship one with respect to the other and the path of light from said source for providing a series of 360° primary optical paths for said light, each 360° path displaced one with respect to the other in a side-by-side relationship in the direction of said length dimension;

d. a plurality of electro optic light reflection control means each provided with electrode means for extending the influence of an electrical potential thereto;

e. said control means supported in an optical light reflection control relationship with said 360° primary optical paths at each of said light output positions in the system; and f. means for selectively frustrating internal light reflections and thereby effect a redirecting of said light away from a selected one of said light output positions to one of said plurality of secondary optical paths upon the extending of said influence to a corresponding one of said control means.

2. The optical system as in claim 1 additionally including:

g. a data viewing medium; and h. light beam deflecting means positioned in relation to said secondary paths for intercepting a series of individual beams of light from said plurality of light output positions and redirecting said beams so as to provide line-at-a-time displays thereof on said viewing medium.

3. The optical system as in claim 1 additionally including:

g. a record medium positioned in relation to said secondary paths for intercepting a series of individual beams of light from said plurality of light output positions; and h. means for moving said record medium so as to provide a line-at-a-time recording of said beams.

4. The optical system as in claim 1 additionally including:

g. a light masking means positioned along each of said secondary optical paths for modifying the cross section, respectively, of each light beam being directed along said path.

5. The optical system as in claim 4 additionally including:

h. light reflector means for directing, selectively, light beams from each said secondary optical path along a common optical path.

6. Light beam reflector means for use in information display apparatus, comprising:

a. a plurality of light admitting surfaces, a light emitting surface and a plurality of light reflecting surfaces intermediate said emitting surface and said admitting surfaces;

b. a source of light and means for directing light therefrom along a plurality of predetermined paths toward, respectively, each of said admitting surfaces;

c. said emitting surface optically related to each said admitting surface by means of said plurality of light reflecting surfaces, each said reflecting surface presenting a length dimension;

d. said reflecting surfaces each oriented one with respect to the other so as to establish a series of 360° optical paths, each displaced one with respect to the other in a side-by-side spiralled relationship in the direction of said length dimension, for allowing the light incident upon any of said admitting surfaces to be reflected therefrom to said emitting surface; and e. means for effecting, selectively, and modifying of said light being directed along said paths toward said admitting surfaces.

7. The invention as set forth in claim 6 wherein said last stated means may consist of a light mask intermediate said source of light and said admitting surfaces having window means in the path of light directed toward each said admitting surface for effecting a modification of said light.

8. Light beam reflector means for use in recording apparatus, comprising:

a. A light admitting surface, a plurality of light emitting surfaces and a plurality of light reflecting surfaces intermediate said admitting surface and said emitting surfaces;

b. a source of light and means for directing light therefrom along a path toward said light admitting surface;

c. said admitting surface optically related to each said emitting surface by means of a plurality of light reflecting surfaces, each said reflecting surface presenting a length dimension;

d. said reflecting surfaces each oriented one with respect to the other so as to establish a series of 360° optical paths, each displaced one with respect to the other in a side-by-side spiralled relationship in the direction of said length dimension, for allowing the light incident upon said admitting surface to be reflected therefrom to each said emitting surface;

e. a plurality of electro optic light reflection control means each provided with electrode means for extending the influence of an electrical potential thereto;

f. said control means supported in an optical light reflection control relationship to each said emitting surfaces along said length dimension for selectively limiting the passage of light through but one of said emitting surfaces upon an extending of said influence to said control means and preventing passage of light through emitting surfaces other than said one emitting surface.

9. The invention as set forth in claim 8 wherein said apparatus includes a record medium and means for recording therewith a passing of light through said emitting surfaces.

* * * * *

UNITED STATES PATENT OFFICE

CERTIFICATE OF CORRECTION

Patent No. 3,872,451 Dated March 11, 1975

Inventor(s) Joseph T. Mc Naney

It is certified that error appears in the above-identified patent and that said Letters Patent are hereby corrected as shown below:

Column 5, line 40, "and" should read -- a --.

Signed and Sealed this

*ninth* Day of *September 1975*

[SEAL]

*Attest:*

RUTH C. MASON
*Attesting Officer*

C. MARSHALL DANN
*Commissioner of Patents and Trademarks*